Feb. 11, 1941. W. J. BELCHER 2,231,380
CLIP
Filed Nov. 6, 1939
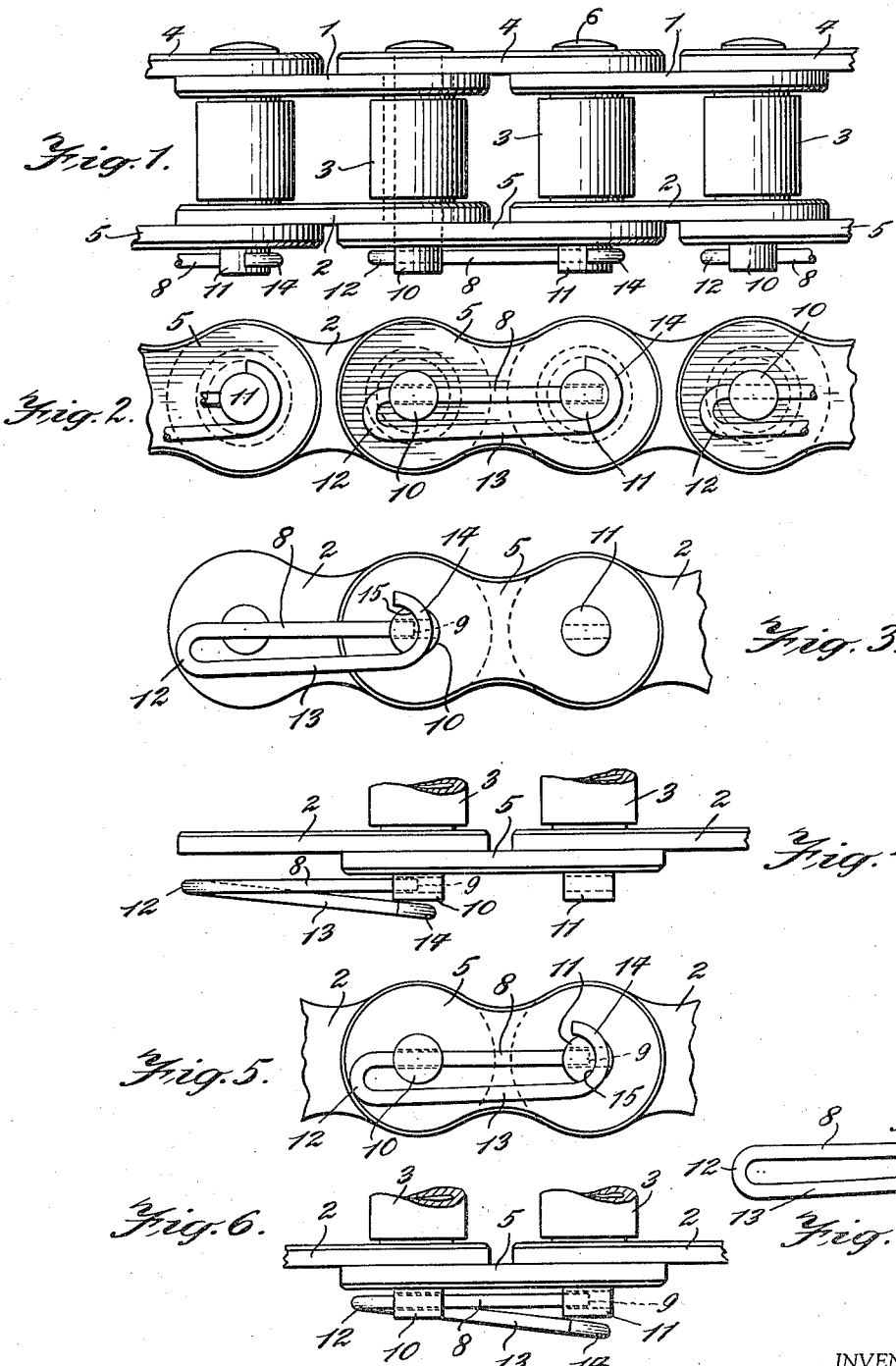
INVENTOR.
Warren J. Belcher,
BY
Gifford, Scull & Burgess.
ATTORNEYS Patented Feb. 11, 1941

2,231,380

UNITED STATES PATENT OFFICE 2,231,380

CLIP

Warren J. Belcher, West Hartford, Conn., assignor to The Whitney Chain & Mfg. Company, Hartford, Conn., a corporation of Connecticut Application November 6, 1939, Serial No. 303,010

1 Claim. (Cl. 85—8.5)

This invention relates to a novel and improved clip or locking pin for use in locking together the parts of a chain, more particularly a roller chain. The invention will be shown in connection with a roller chain and will be more readily understood from the following description and the annexed drawing in which I have shown a selected embodiment of the invention and in which:

Fig. 1 is a plan view of a portion of a roller chain having my clip applied thereto;

Fig. 2 is an elevation of the structure shown in Fig. 1, with the clip in place;

Fig. 3 is a view on the same plane as Fig. 2 but showing the clip in the initial steps of being applied to the chain;

Fig. 4 is a plan view of the structure as it appears in Fig. 3;

Fig. 5 is a view similar to Fig. 3 but showing the clip in another stage of being applied to the chain;

Fig. 6 is a view similar to Fig. 4 but showing the parts in positions corresponding to those shown in Fig. 5;

Fig. 7 is a view of a clip detached from the chain.

Chains, particularly the roller type, usually comprise elements pivotally connected by pivot pins, certain elements consisting of blocks formed of side plates 1 and 2 which may be fastened together by bushings or other devices to support rollers 3. The blocks are usually pivotally connected by other elements, as pin plates 4 and 5, and it is a common practice to secure the head 6 of a pin in one of the pin plates 4 before the chain is assembled. Then the pin is inserted through the roller 3 and aligned holes in the side plates 1 and 2 of the block, and the other end of the pin is secured by any one of various means.

Since roller chain is oftentimes given hard usage, particularly when it is employed on heavy trucks, it is desirable to have the pins locked in such a way that they may be removed either alone or with one of the pin plates. For that reason it is common to use cotter pins or other temporary locking devices on the unheaded ends of the pins. Such devices, however, have not been as satisfactory as might be desirable, because of their tendency to work loose. Moreover, when trucks are used for rough work, it oftentimes happens that locking pins are driven out of place and the chains forced apart. For example, on trucks used in construction work it is not uncommon that when a truck is backed up it may be backed into a pile of crushed stone and the locking pins knocked loose by contact with the stone.

According to my invention, I provide a clip constructed in such a way that the chance of accidental displacement is reduced to a minimum. The clip comprises a body 8 having a free end 9 and in the illustrated embodiment this body is shown of such length that it may pass through two aligned holes in the ends of two adjacent pivot pins 10 and 11. The clip may be made of wire or bar or rod material, but, for the sake of convenience, the material may be referred to as a wire.

At the end of the body opposite the free end, the wire is bent in the form of a U, as shown at 12, and then extends generally parallel to the body 8, as shown at 13, the part 13, which may be referred to as an arm, being spaced from the body 8 somewhat more than half the diameter of one of the pivot pins. Then the arm 13 is bent across the free end 9 to form a guard 14, generally of U shape and having an inner surface 15 which has a radius approximately that of one of the pivot pins.

In operation, the free end of the body 8 may be inserted through a hole in the pivot pin 10, the guard 14 being sprung transversely of the free end enough so that it will pass over the end of the pivot pin, as plainly shown in Figs. 3 and 4. While the material of which the wire is made is purposely such as to make the wire stiff, nevertheless there is sufficient resiliency to permit the action illustrated in Figs. 3 and 4.

Then by pushing the body further towards the right, the free end 9 may be inserted in the hole in the end of the pivot pin 11, the guard 14 being once more sprung outwardly, as shown in Figs. 5 and 6. Then further pressure on the clip, for example on the U 12, will cause the guard to spring into the positions shown in Figs. 1 and 2, wherein it will snugly engage the surface of the pivot pin 11.

When the parts are in the positions shown in Figs. 1 and 2, it will be seen that the clip cannot be moved towards the right of those figures, because that movement is prevented by the U 12 of the clip which thus forms a stop, this stop engaging the lower half of the pin 10, as viewed in Fig. 2. Likewise, movement of the clip towards the left of Figs. 1 and 2 is prevented by engagement of the guard 14 with the pivot pin 11. Preferably the guard is directly across the free end 9 of the body, thus also protecting that free end against any blows which would tend to dislodge the clip. Although when in the claims I refer to the guard as being "across" the free end, I do not mean that it necessarily covers the free end, although it does extend transversely thereof. It is preferable, however, that the guard should cover the free end.

While I have shown the invention as embodied in a certain form, I am aware that various changes may be made in details and therefore I do not intend to limit myself except by the appended claims.

I claim:

A clip for a chain having elements pivotally connected together by pivot pins passing through said elements, said clip comprising a body passing through aligned holes in two adjacent pins and having a free end disposed in one of said holes, an arm connected to the other end of the body by a U-bend and extending lengthwise of the body and spaced therefrom and having a U-shaped guard extending across said hole in which said free end of the body is disposed and engaging the pivot pin having that hole therein, said clip being made of resilient material, whereby said guard may be deflected relatively to said free end of said body to permit said free end to be passed through said aligned holes in the pivot pins.

WARREN J. BELCHER.